US012692607B2

(12) United States Patent
Philips et al.

(10) Patent No.: US 12,692,607 B2
(45) Date of Patent: Jul. 28, 2026

(54) METHOD FOR THE PREPARATION OF A GAS DIFFUSION LAYER AND A GAS DIFFUSION LAYER OBTAINED OR OBTAINABLE BY SUCH METHOD

(71) Applicant: Avantium Knowledge Centre B.V., Amsterdam (NL)

(72) Inventors: Matthew Francis Philips, Amsterdam (NL); Davide Ansovini, Amsterdam (NL); Marta Catarina Costa Figueiredo, Amsterdam (NL)

(73) Assignee: Avantium Knowledge Centre B.V., Amsterdam (NL)

( * ) Notice: Subject to any disclaimer, the term of this patent is extended or adjusted under 35 U.S.C. 154(b) by 1047 days.

(21) Appl. No.: 17/420,549

(22) PCT Filed: Feb. 10, 2020

(86) PCT No.: PCT/EP2020/053274
§ 371 (c)(1),
(2) Date: Jul. 2, 2021

(87) PCT Pub. No.: WO2020/165074
PCT Pub. Date: Aug. 20, 2020

(65) Prior Publication Data
US 2022/0112613 A1     Apr. 14, 2022

Related U.S. Application Data

(60) Provisional application No. 62/806,486, filed on Feb. 15, 2019.

(30) Foreign Application Priority Data

May 9, 2019    (EP) .................................... 19173419

(51) Int. Cl.
| | |
|---|---|
| *C25B 11/032* | (2021.01) |
| *C25B 3/26* | (2021.01) |
| *C25B 11/04* | (2021.01) |
| *C25B 11/052* | (2021.01) |
| *H01M 4/88* | (2006.01) |
| *H01M 8/0234* | (2016.01) |
| *H01M 8/0245* | (2016.01) |

(52) U.S. Cl.
CPC .............. *C25B 11/032* (2021.01); *C25B 3/26* (2021.01); *C25B 11/04* (2013.01); *C25B 11/052* (2021.01); *H01M 4/8807* (2013.01); *H01M 8/0234* (2013.01); *H01M 8/0245* (2013.01)

(58) Field of Classification Search
CPC ....... C25B 3/26; C25B 11/032; C25B 11/052; C25B 3/00; C25B 3/25; C25B 11/031; H01M 8/0245; H01M 4/8807

USPC .............. 429/530; 204/284, 290.03, 290.05, 204/290.07, 290
See application file for complete search history.

(56) References Cited

U.S. PATENT DOCUMENTS

| | | | | |
|---|---|---|---|---|
| 4,602,426 | A | * | 7/1986 | Kampe ............... H01M 4/8821 429/530 |
| 4,927,514 | A | * | 5/1990 | Solomon ................. H01M 4/86 204/290.06 |
| 6,103,077 | A | * | 8/2000 | DeMarinis .......... H01M 8/1004 429/523 |
| 6,803,143 | B2 | * | 10/2004 | Zuber ..................... H01M 4/96 429/535 |
| 9,145,615 | B2 | * | 9/2015 | Zhai .......................... C25B 3/25 |
| 11,063,284 | B2 | * | 7/2021 | Noda .................. H01M 4/8807 |
| 2005/0106450 | A1 | | 5/2005 | Castro et al. |
| 2009/0011308 | A1 | * | 1/2009 | Lee ..................... H01M 8/0245 429/479 |
| 2011/0262828 | A1 | * | 10/2011 | Noda ................... H01M 8/102 429/530 |

(Continued)

FOREIGN PATENT DOCUMENTS

| | | | | | |
|---|---|---|---|---|---|
| CN | 107507983 | A | * | 12/2017 | .......... H01M 8/1004 |
| JP | 2011076739 | A | | 4/2011 | |
| WO | WO-2015184388 | A1 | * | 12/2015 | .............. C25B 1/02 |
| WO | 2017112900 | A1 | | 6/2017 | |

OTHER PUBLICATIONS

Shell Chemicals ("ShellSol D70 Technical Datasheet" 2016) (Year: 2016).*

(Continued)

*Primary Examiner* — Luan V Van
*Assistant Examiner* — Alexander R. Parent
(74) *Attorney, Agent, or Firm* — Suiter Swantz IP

(57) ABSTRACT

Method for the preparation of a gas diffusion layer, containing the steps of: a) preparing a carrier-binder paste comprising a solvent, a fluorinated binder and conductive carrier articles; b) preparing an adhesive composition comprising a solvent, a fluorinated binder and essentially no or equal to or less than 15 wt. % of conductive carrier particles, based on the total weight of fluorinated binder and any conductive carrier particles; and c) combining a layer of supporting material, a layer of the adhesive composition and a layer of the carrier-binder paste, wherein the layer of the adhesive composition is applied between the layer of supporting material and the layer of the carrier-binder paste, and pressing the combination of supporting material, adhesive composition and carrier-binder paste at a pressure of at least 15 kilopascal and/or heating the combination of supporting material, adhesive composition and carrier-binder paste at a temperature of at least 300° C.

15 Claims, No Drawings

(56)                    References Cited

U.S. PATENT DOCUMENTS

| | | | | |
|---|---|---|---|---|
| 2014/0017589 A1* | 1/2014 | Takami | ............... | H01M 8/0245 |
| | | | | 429/480 |
| 2014/0227634 A1 | 8/2014 | Gulla et al. | | |
| 2015/0354072 A1* | 12/2015 | Suchsland | ........... | H01M 8/0245 |
| | | | | 204/290.01 |
| 2018/0006315 A1 | 1/2018 | Pierpont et al. | | |
| 2019/0112720 A1* | 4/2019 | Skinn | ........................ | C25B 3/25 |

OTHER PUBLICATIONS

Rumble ed. "Physical Constants of Organic Compounds" in CRC Handbook of Chemistry and Physics, 105th Edition (Internet Version 2023) (Year: 2023).*

Lin et al. "Effect of Thickness and Hydrophobic Polymer Content of the Gas Diffusion Layer on Electrode Flooding Level in a PEMFC" Journal of The Electrochemical Society, 152 (10) A1942-A1948 2005 (Year: 2005).*

International Search Report mailed Mar. 27, 2020 for PCT/EP2020/053274.

Bidault, Development of Alkaline Fuel Cell Gas Diffusion Cathodes using new Substrate Materials, Imperial College London, Mar. 2010, chapter 2.

Mahmood et al., "Use of gas-diffusion electrodes for high-rate electrochemical reduction of carbon dioxide. Reduction at lead, indium- and tin-impregnated electrodes", published in the Journal of applied electrochemistry, vol. 17, (1987), pp. 1159 to 1170.

Tomantschger et al, "Structural analysis of alkaline fuel cell electrodes and electrode materials", published in the Journal of Power sources, vol. 25 (1989), pp. 195-214.

* cited by examiner

METHOD FOR THE PREPARATION OF A GAS DIFFUSION LAYER AND A GAS DIFFUSION LAYER OBTAINED OR OBTAINABLE BY SUCH METHOD

FIELD OF THE INVENTION

This invention relates to a method for the preparation of a gas diffusion layer, a gas diffusion layer obtained or obtainable by such method, a method for the preparation of a gas diffusion electrode, a gas diffusion electrode obtained or obtainable by such method, an electrochemical cell comprising such a gas diffusion layer or gas diffusion electrode and a process for electrochemically reducing carbon dioxide.

BACKGROUND TO THE INVENTION

Gas diffusion electrodes (GDE's) are a known type of electrodes. They can be used in electrochemical reactions where one or more of the reactants are in the gas phase.

An example is provided by Tomantschger et al, in their article titled "Structural analysis of alkaline fuel cell electrodes and electrode materials", published in the Journal of Power sources, vol. 25 (1989), pages 195-214, where the use of gas diffusion electrodes in alkaline fuel cells is described.

Another example is described by Mahmood et al. in their article titled "Use of gas-diffusion electrodes for high-rate electrochemical reduction of carbon dioxide. Reduction at lead, indium- and tin-impregnated electrodes", published in the Journal of applied electrochemistry, vol 17, (1997), pages 1159 to 1170.

WO2015184388A1 and WO2017112900A1 give further examples of the use of gas diffusion electrodes in methods for the conversion of carbon dioxide.

As explained by Bidault in his thesis titled "Development of Alkaline Fuel Cell Gas Diffusion Cathodes using new Substrate Materials, Imperial College London, March 2010, chapter 2, in general, gas diffusion electrodes consist of several layers, which fulfil different functions. Bidault describes an electrode structure comprising a backing material (BM), a gas diffusion layer (GDL) and a catalytic or active layer (AL). The BM can serve as a current collector and can for example be a metal mesh. The GDL can supply the reactant gas to the AL and can prevent liquid electrolyte from passing through the electrode. For common, so-called bipolar designs, a conductive GDL comprising mixtures of polytetrafluoroethylene (PTFE) with conducting carbon support are favored. The active layer (AL) contains the catalyst which is usually supported on carbon black and bonded together with PTFE.

WO2017112900A1 describes a more complex gas diffusion electrode, including a current collector; a fluorinated binder; a carbon support including a carbon cloth or graphitized carbon weave; and a catalyst. WO2017112900A1 describes that the gas diffusion electrode may comprise a hydrophobic fluorinated binder layer that may be bonded to a carbon cloth support via heat and compression (200-400° C. and 20-60 kPa). As illustrated in its FIGS. 2 and 4, such hydrophobic fluorinated binder layer is positioned between the carbon cloth and the current collector, and the carbon cloth support is positioned between the hydrophobic fluorinated binder layer and the catalyst layer so as to provide a hydrostatic head barrier separated from the catalyst layer.

US2014/0227634 describes a gas diffusion electrode comprising a gas diffusion layer laminated on a reinforcement member, said gas-diffusion layer consisting of a sintered and cast conductive powder/fluorinated binder composition. The gas diffusion electrode is described to be manufactured by preparing a paste comprising a fluorinated binder and a conductive powder, such as carbon black; calendering the paste into layers, laminating said layers onto a reinforcement member under a heated press at a temperature of 100° C. to 150° C. and a pressure of 12 to 24 kilopascal, and subsequently bringing the temperature up to 300° C.-400° C. and the pressure to 25-50 kilopascal. Hereafter the pressure was released to atmospheric and the laminated structure was exposed to air to induce sintering. Thereafter the sintered structure was casted under a heated press at a temperature of 300° C. to 400° C. and a pressure of 30 to 60 kilopascal.

Bidault explains that the performance and durability of a gas diffusion electrode is very much dependent on the way in which the layer structures are fabricated from for example carbon and polytetrafluoroethylene (PTFE).

US 2009/0011308A1 describes a method of preparing a gas diffusion layer for fuel cells wherein a carbon slurry, comprising carbon powder and fluorinated resin, is coated on a carbon substrate followed by drying to form a primer layer, followed by forming a microporous layer on the primer layer; and thermally treating the resultant product. The carbon slurry used for coating the primer layer comprises 5 to 100 parts by weight, more preferably 10 to 30 parts by weight of a fluorinated resin, based on 100 parts by weight of the carbon powder.

U.S. Pat. No. 4,602,426A describes a method for the production of a gas diffusion electrode, wherein several layers of dry mixtures (i.e., no solvent) of electrochemically active material (activated carbon), wetproofing agent (fluorocarbon polymer) and a pore-forming agent in varying proportions are superimposed on a current-collector material and pressed to form an electrode, followed by removal of the pore-forming agent. According to this document, by varying the proportions of wetproofing agent and electrochemically active material in the dry mixtures used for preparing the super-imposed layers, a composition gradient of the electrochemically active material will be present throughout the thickness of the electrode.

US 2018/006315 A1 is in the field of electrochemical devices utilizing polymer electrolyte membranes and is concerned with improving anchoring of gas distribution layers to the catalyst-coated membrane. It describes a method of electrospinning or electrospraying an adhesive composition comprising a fluorinated polymer onto a gas distribution layer, followed by bonding said adhesive-coated gas distribution layer to a catalyst-coated membrane to form a membrane electrode assembly.

It is desirable that a gas diffusion electrode has good mechanical properties and remains mechanically stable during operation for a prolonged period of time. Although good results can be achieved with the prior art gas diffusion electrodes, it was found that their mechanical stability could still be improved. For example, it would be desirable to have a gas diffusion layer, where the carbon-fluorinated binder paste is firmly attached to its support and cannot be easily detached or delaminated therefrom.

It would be an advancement in the art to provide a method to prepare a gas diffusion layer and/or a gas diffusion electrode having such improved mechanical stability.

SUMMARY OF THE INVENTION

Such a method has now been obtained with the method according to the invention. Accordingly, the present invention provides in a first aspect a method for the preparation of a gas diffusion layer, containing the steps of:

a) preparing a carrier-binder paste comprising a solvent, a fluorinated binder and conductive carrier particles;

b) preparing an adhesive composition comprising
  a solvent,
  a fluorinated binder and
  essentially no or equal to or less than 15 wt. % of conductive carrier particles, based on the total weight of fluorinated binder and any conductive carrier particles; and c) combining a layer of supporting material, a layer of the adhesive composition and a layer of the carrier-binder paste, wherein the layer of the adhesive composition is applied between the layer of supporting material and the layer of the carrier-binder paste, and
  pressing the combination of supporting material, adhesive composition and carrier-binder paste at a pressure of at least 15 kilopascal and/or
  heating the combination of supporting material, adhesive composition and carrier-binder paste at a temperature of at least 300° C.

Such a method advantageously allows one to obtain a gas diffusion layer. Such gas diffusion layer advantageously has an improved mechanical stability, wherein the carrier-binder paste cannot be easily detached or delaminated from the layer of supporting material.

In a second aspect, the present invention provides a method for the preparation of a gas diffusion electrode, containing the steps of:

a) preparing a carrier-binder paste comprising a solvent, a fluorinated binder and conductive carrier particles;

b) preparing an adhesive composition comprising
  a solvent,
  a fluorinated binder and
  essentially no or equal to or less than 15 wt. % of conductive carrier particles, based on the total weight of fluorinated binder and any conductive carrier particles; and c) combining a layer of supporting material, a layer of the adhesive composition and a layer of the carrier-binder paste, wherein the layer of the adhesive composition is applied between the layer of supporting material and the layer of the carrier-binder paste, and
  pressing the combination of supporting material, adhesive composition and carrier-binder paste at a pressure of at least 15 kilopascal and/or
  heating the combination of supporting material, adhesive composition and carrier-binder paste at a temperature of at least 300° C.; and d) applying a catalytic layer, which catalytic layer comprises a catalyst, onto the layer of carrier-binder paste on the side opposite of the side where the layer of the adhesive composition was applied.

Such a method advantageously allows one to obtain a gas diffusion electrode. Such gas diffusion electrode advantageously has an improved mechanical stability.

In a third aspect, the present invention provides an electrochemical cell comprising a gas diffusion layer as mentioned above and/or a gas diffusion electrode as mentioned above.

In a fourth aspect, the present invention provides a process for electrochemically reducing carbon dioxide, comprising:

introducing an anolyte to a first cell compartment of an electrochemical cell, the first cell compartment comprising an anode;

introducing a catholyte and carbon dioxide to a second cell compartment of the electrochemical cell, the second cell compartment comprising a cathode; and applying an electrical potential between the anode and the cathode sufficient to reduce the carbon dioxide to a reduced reaction product, wherein the cathode comprises a gas diffusion layer as mentioned above and/or a gas diffusion electrode as mentioned above.

As illustrated in the examples, the above gas diffusion layer has an improved mechanical stability, which greatly reduces the risk of detachment or delamination of the carrier-binder paste from the supporting material during operation. This in turn allows one to make a mechanically more stable gas diffusion electrode that can be operated for a prolonged period of time.

DETAILED DESCRIPTION OF THE INVENTION

By a gas diffusion electrode is herein suitably understood an electrode that can be used in electrochemical reactions where one or more of the reactants are in the gas phase. In addition, one or more of the other reactants and/or one or more products can be in the liquid phase or can be dissolved in a liquid.

The gas diffusion electrode described herein can contain a gas diffusion layer (GDL) and an active layer (AL). The active layer (AL) contains the catalyst and is herein also referred to as the catalytic layer. In addition a backing material can be present. The backing material can serve to reinforce the gas diffusion electrode. The backing material can be present as a part of an electrochemical cell that is used to attach the gas diffusion electrode to. It is also possible to attach a backing material directly to the gas diffusion electrode, i.e. where the backing material would be part of the gas diffusion electrode. When part of the gas diffusion electrode, the backing material is preferably attached to the layer of supporting material of the gas diffusion layer. Preferably the backing material consists of a conductive material, such as a metal. The backing material can for example be an expanded or woven metal, a metal foam or metal mesh or another rigid structure.

Gas diffusion layers (GDL's) can have complex structures and can comprise multiple porous layers and/or components. The gas diffusion layer described herein suitably contains a carrier-binder layer prepared from the carrier-binder paste combined with a layer of supporting material, attached to each other via an adhesive layer prepared from the adhesive composition. The layer of carrier-binder is preferably microporous, i.e. resulting in a microporous carrier-binder layer. The layer of supporting material is preferably macroporous, i.e. a macroporous supporting material layer. The combination of such microporous carrier-binder layer and such macroporous supporting material layer can advantageously be used for the transport of a gas, such as carbon dioxide, into the gas diffusion electrode, as explained in WO2017112900A1.

Hereinbelow preferences for the invention are described.

Step a) comprises preparing a carrier-binder paste comprising a solvent, a fluorinated binder and conductive carrier particles.

Examples of suitable conductive carrier particles include carbon particles and/or conductive ceramic particles. Preferably the conductive carrier particles are carbon particles. More preferably so-called carbon black particles are used. For example, Shawinigan acetylene carbon black or Vulcan carbon can be used. The conductive carrier particles preferably have a particle size distribution having a mean diameter in the range from equal to or more than 5 nanometers to equal to or less than 350 nanometers, more preferably in the range from equal to or more than 10 nanometers to equal to or less than 200 nanometers and most preferably in the range from equal to or more than 15 nanometers to equal to or less than 100 nanometers. The particle size can be measured indirectly by measurement of the so-called nitrogen surface area (for example according to ASTM method D6556-17 titled "Standard Test Method for Carbon Black—Total and External Surface Area by Nitrogen Adsorption"). The conductive carrier particles preferably have a surface area in the range from equal to or more than 5 square meter per gram ($m^2/g$) to equal to or less than 150 $m^2/g$, more preferably in the range from equal to or more than 10 $m^2/g$ to equal to or less than 150 $m^2/g$, and most preferably in the range from equal to or more than 20 $m^2/g$ to equal to or less than 150 $m^2/g$. The use of conductive carrier particles, preferably carbon particles, having the above particle size and/or surface area can allow one to obtain a suitably conductive carrier-binder paste.

The fluorinated binder preferably comprises one or more fluorinated polymers chosen from the group consisting of polytetrafluoroethylene (PTFE) polymers, perfluoroalkoxy (PFA) polymers, fluorinated ethylene propylene (FEP) polymers and polyvinylidene difluoride (PVDF) polymers. More preferably the fluorinated binder comprises or consists of PTFE polymers. Use of the above fluorinated binders as binder can allow one to obtain a suitably hydrophobic carrier-binder paste. When used in the methods according to the invention the use of the fluorinated binders as binder can further suitably allow one to obtain suitably stable gas diffusion layer and/or a conductive gas diffusion electrode.

Due to agglomeration of fluorinated binder particles, the mean diameter of the particle size distribution of the fluorinated binder particles may change when carrying out the methods according to the invention. At the start of the method, however, the fluorinated binder preferably has a particle size distribution with an average diameter in the range from equal to or more than 10 nanometers (corresponding to about 0.01 micrometer) to equal to or less than 1000 nanometers (corresponding to about 1 micrometer), more preferably in the range from equal to or more than 50 nanometers to equal to or less than 500 nanometers and most preferably in the range from equal to or more than 100 nanometers to equal to or less than 300 nanometers. For example, at the start of the method the fluorinated binder may have a particle size distribution with an average diameter of about 0.2 micrometer (corresponding to about 200 nanometer). The average diameter of the fluorinated binder particles can conveniently be determined according to ISO method ISO 13321, titled "Particle size analysis—Photon correlation spectroscopy".

Preferably, the carrier-binder paste contains, based on the total weight of fluorinated binder and conductive carrier particles together, in the range from equal to or more than 20 wt. % to equal to or less than 60 wt. % of fluorinated binder and in the range from equal to or more than 40 wt. % to equal to or less than 80 wt. % of conductive carrier particles. More preferably the carrier-binder paste contains, based on the total weight of fluorinated binder and conductive carrier particles together, in the range from equal to or more than 25 wt. % to equal to or less than 40 wt. % of fluorinated binder and in the range from equal to or more than 60 wt. % to equal to or less than 75 wt. % of conductive carrier particles.

In addition, the carrier-binder paste may contain additives, such as one or more pore forming agents and/or surfactants. Suitably the carrier-binder composition may further contain, based on the total weight of fluorinated binder and any additives, a total in the range from equal to or more than 0.05 wt. % to equal to or less than 10 wt. % of additives, more preferably in the range from equal to or more than 0.1 wt. % to equal to or less than 5 wt. % of additives. The carrier-binder paste can for example contain additives to decrease ohmic resistance, surfactants and/or pore forming agents. Examples of additives to decrease ohmic resistance include titanium and nickel and their oxides. Examples of surfactants include polyoxyethylene alkylethers. Examples of pore forming agents include sugars and ammonium carbonate.

Preferably the solvent in the carrier-binder paste of step a) contains or consists of water and/or an alkanol. More preferably the solvent is a mixture of water and an alkanol. Preferably the alkanol is an alkanol comprising in the range from 1 to 8 carbon atoms, more preferably in the range from 1 to 6 carbon atoms and most preferably in the range from 1 to 4 carbon atoms. Examples of alkanols that can be used include methanol, ethanol, n-propanol, isopropanol, n-butanol, iso-butanol, tert-butanol, pentanol, hexanol and mixtures thereof. Preferred alkanols are ethanol, n-propanol and isopropanol. Without wishing to be bound by any kind of theory, the presence of the alkanol is believed to improve wettability of the conductive carrier particles. In addition, the presence of an alkanol may induce gelling upon mixing of the fluorinated binder in the solvent.

If a mixture of water and an alkanol is used as a solvent, such mixture preferably comprises in the range from equal to or more than 5 vol. % to equal to or less than 95 vol. of water and in the range from equal to or more than 5 vol. % to equal to or less than 95 vol. of alkanol, based on the total volume of the mixture. More preferably such a mixture of water and alkanol comprises in the range from equal to or more than 25 vol. % to equal to or less than 75 vol. % of water and in the range from equal to or more than 25 vol. % to equal to or less than 75 vol. % of alkanol, based on the total volume of the mixture. A mixture of water and alkanol of about 50 vol. % water and about 50 vol. % alkanol is also possible. Most preferably a solvent mixture comprising or consisting of ethanol and water or a solvent mixture comprising or consisting of isopropanol and water is used as a solvent.

Preferably the carrier-binder paste is prepared by making a suspension of the fluorinated binder in the solvent and subsequently mixing the conductive carrier particles with the suspension. Alternatively the carrier binder paste can be prepared by making a suspension of the conductive carrier particles in the solvent and subsequently mixing the fluorinated binder with the suspension; or the fluorinated binder and the conductive carrier particles can be mixed simultaneously with the solvent to prepare the suspension. The mixing can be carried out at a wide range of temperatures, but is preferably carried out at a temperature equal to or less than 40° C. and most preferably at ambient temperature (about 20° C.). Further the mixing can be carried out at a wide range of pressures, but is preferably carried out at a pressure equal to or less than 0.2 megapascal (corresponding to about 2 bar) and most preferably at atmospheric pressure (about 0.1 megapascal, corresponding to about 1 bar). Preferably the mixing is carried out at ambient humidity. By humidity is herewith understood the amount of water in the air. Suitably the mixing is carried out at a humidity in the range from 20% to 60%, more suitably in the range from 40% to 60%.

A suspension of the fluorinated binder in the solvent can be prepared in any manner known to be suitable for such by a person skilled in the art. The fluorinated binder is commercially available either as a dry powder or as a ready-made aqueous dispersion in water. The suspension can for example be prepared by mixing a fluorinated binder as a dry powder with the solvent. It is also possible to use a commercially available aqueous dispersion of fluorinated binder and diluting such to a desired concentration to prepare the desired suspension of fluorinated binder in solvent. Dispersions of fluorinated binder in water are commercially available. Preferences, such as for the type and particle size of the fluorinated binder are as mentioned above.

Preferably a suspension of fluorinated binder in solvent for use in the carrier-binder paste comprises a concentration of fluorinated binder in the range from equal to or more than 0.05 gram/milliliter (g/ml) to equal to or less than 0.5 g/ml, more preferably in the range from equal to or more than 0.1 g/ml to equal to or less than 0.3 g/ml.

For step a), preferably the solvent in the carrier-binder paste contains an alkanol and the suspension of the fluorinated binder in such solvent is prepared by:

combining the fluorinated binder and the solvent; and mixing the fluorinated binder and the solvent during a
    period in the range from equal to or more than 10
    seconds to equal to or less than 15 minutes, more
    preferably to equal to or less than 10 minutes and most
    preferably to equal to or less than 3 minutes. More
    preferably the fluorinated binder and the solvent are
    mixed during a period in the range from equal to or
    more than 30 seconds to equal to or less than 3 minutes.

Preferably the obtained suspension of the fluorinated binder in the solvent is thereafter immediately combined with the conductive carrier particles. Preferences for the conductive carrier particles are as described above. The amount of conductive carrier particles is preferably targeted such that a carrier-binder paste is obtained having the preferred percentages of fluorinated binder and conductive carrier particles as explained above.

Without wishing to be bound by any kind of theory it is believed that the mixing of the fluorinated binder with a solvent containing an alkanol causes gelling and can be beneficial for the mechanical stability of the gas diffusion layer and the gas diffusion electrode. Mixing for a too long period (for example longer than 15 minutes), however, is believed to may cause too much gelling which may make the suspension more difficult to mix with the conductive carrier particles.

The adding and mixing of the conductive carrier particles with/to the suspension of fluorinated binder in the solvent can be carried out in any manner known to be suitable for such by a person skilled in the art. The mixing may for example be carried out by manual mixing or kneading, or with the help of an industrial mixer or kneader.

After adding and mixing the conductive carrier particles with/to the suspension of fluorinated binder in the solvent, a carrier-binder paste is obtained that can be used subsequent steps. The carrier-binder paste so obtained may or may not already have a desired porous structure. Suitably the carrier-binder paste may obtain the desired porous structure during step c).

A layer of the carrier-binder paste can be prepared in any manner known by a person skilled in the art. In the preparation of a layer of the carrier-binder paste, extruding, pressing, rolling, or a combination of such, can be used. Rolling techniques are most preferred. Preferably a layer of carrier-binder paste is prepared that has a thickness in the range from equal to or more than 0.2 millimeter (mm) to equal to or less than 3.0 mm, more preferably in the range from equal to or more than 0.5 mm to equal to or less than 2.5 mm.

Step b) comprises preparing an adhesive composition comprising a solvent, a fluorinated binder and essentially no or equal to or less than 15 wt. % of conductive carrier particles, based on the total weight of fluorinated binder and any conductive carrier particles.

The fluorinated binder in step b) can be chosen independently from the fluorinated binder in step a). The fluorinated binder in step b) can therefore be the same or different from the fluorinated binder in step a). Preferably the fluorinated binder in step b) is the same as the fluorinated binder in step a). Preferences for the type of fluorinated binder in step b) are as described above for step a).

If present, the conductive carrier particles in step b) can be chosen independently from the conductive carrier particles in step a). The conductive carrier particles in step b), if present, can therefore be the same or different from the conductive carrier particles in step a). Preferably the type and particle size of the conductive carrier particles in step b), if present, is the same or similar as the type and particle size of the conductive carrier particles in step a). Preferences for the type of conductive carrier particles in step b), if present, are as described above for step a). If present, the conductive carrier particles in step b) are preferably present in the adhesive composition in an amount of equal to or less than 10 wt. %, more preferably equal to or less than 5 wt. %, still more preferably equal to or less than 1 wt. % and most preferably equal to or less than 0.5 wt %, based on the total weight of fluorinated binder and conductive carrier particles. Most preferably, however, no or essentially no conductive carrier particles, such as carbon particles, are present in step b). That is, most preferably the adhesive composition is an adhesive composition in which such conductive carrier particles, such as carbon particles, are absent or essentially absent. Without wishing to be bound by any kind of theory, it is believed that the presence of such conductive carrier particles, such as carbon particles, can reduce the adhesive strength of the adhesive composition. The absence of any carbon particles is believed to allow one to obtain a more stable gas diffusion layer and/or a more stable gas diffusion electrode.

The solvent in the adhesive composition of step b) can be chosen independently from the solvent in the carrier-binder paste of step a). Such solvent in step b) can therefore be the same or different from the solvent in step a). Preferably such solvent in the adhesive composition of step b) is the same as the solvent in the carrier-binder paste of step a). Preferably the solvent in the adhesive composition of step b) contains or consists of water and/or an alkanol. More preferably the solvent in the adhesive composition is a mixture of water and an alkanol. Further preferences for the type of any solvent in step b) are as described above for step a).

In addition, the adhesive composition may contain additives, such as one or more pore forming agents and/or surfactants. Suitably the adhesive composition may contain, based on the total weight of fluorinated binder and any additives, a total in the range from equal to or more than 0.05 wt. % to equal to or less than 10 wt. % of additives, more preferably in the range from equal to or more than 0.1 wt. % to equal to or less than 5 wt. % of additives. The adhesive composition can for example contain additives to decrease ohmic resistance, surfactants and/or pore forming agents. Examples of additives to decrease ohmic resistance include titanium and nickel and their oxides. Examples of surfactants include polyoxyethylene alkylethers. Examples of pore forming agents include sugars and ammonium carbonate.

Preferably, in step b), the adhesive composition is prepared by making a suspension of the fluorinated binder, and optionally one or more additives, in a solvent.

The suspension of the fluorinated binder in the solvent for use in the adhesive composition for step b) can be prepared in a similar manner as the suspension of the fluorinated binder in the solvent for use in the carrier-binder paste for step a).

Preferably the suspension of fluorinated binder in solvent for use in the adhesive composition comprises more fluorinated binder than the suspension of fluorinated binder in solvent for use in the carrier-binder paste. As a consequence the adhesive composition preferably comprises a higher concentration of fluorinated binder, based on grams of fluorinated binder per milliliter of solvent, than the carrier-binder paste. More preferably the carrier-binder paste and/or the suspension of fluorinated binder in solvent for use in the carrier-binder paste comprises equal to or less than 0.3 grams fluorinated binder per milliliter of solvent, whereas the adhesive composition and/or the suspension of fluorinated binder in solvent for use in the adhesive composition preferably comprises equal to or more than 0.3 grams fluorinated binder per milliliter of solvent.

Preferably a suspension of fluorinated binder in solvent for use in the adhesive composition comprises a concentration of fluorinated binder in the range from equal to or more than 0.1 g/ml (grams fluorinated binder per milliliters of solvent) to equal to or less than 1.0 g/ml, more preferably in the range from equal to or more than 0.2 g/ml to equal to or less than 0.7 g/ml, and most preferably in the range from equal to or more than 0.3 g/ml to equal to or less than 0.6 g/ml.

For step b) the solvent in the adhesive composition preferably contains an alkanol and the suspension of the fluorinated binder in such solvent is preferably prepared by:

combining the fluorinated binder and the solvent; and mixing the fluorinated binder and the solvent during a period in the range from equal to or more than 10 seconds to equal to or less than 15 minutes, more preferably to equal to or less than 10 minutes and most preferably to equal to or less than 3 minutes. More preferably the fluorinated binder and the solvent are mixed during a period in the range from equal to or more than 30 seconds to equal to or less than 3 minutes.

In step b) an adhesive composition can be obtained that can be used in subsequent steps. The adhesive composition so obtained may or may not already have a desired porous structure. Suitably the adhesive composition may obtain the desired porous structure during step c).

A layer of the adhesive composition can be prepared in any manner known by a person skilled in the art. Preferably an appropriate layer is prepared by painting, coating, spraying, airbrushing or dipping the surface of either the layer of supporting material or the layer of carrier-binder paste with the adhesive composition. Preferably a layer of adhesive composition is prepared that has a thickness in the range from equal to or more than 1 micrometer (μm) to equal to or less than 100 micrometer (μm). More preferably a layer of adhesive composition is prepared that has a thickness in the range from equal to or more than 5 micrometer (μm) to equal to or less than 50 micrometer (μm), more preferably in the range from equal to or more than 10 micrometer (μm) to equal to or less than 30 micrometer (μm).

Step c) comprises combining a layer of supporting material, a layer of the adhesive composition and a layer of the carrier-binder paste, wherein the layer of the adhesive composition is applied between the layer of supporting material and the layer of the carrier-binder paste, and pressing the combination of supporting material, adhesive composition and carrier-binder paste at a pressure of at least 15 kilopascal and/or heating the combination of supporting material, adhesive composition and carrier-binder paste at a temperature of at least 300° C.

Preferably the layer of supporting material is a layer of a porous supporting material. Preferred supporting materials include carbon cloth, graphitized carbon felt, carbon weave, carbon paper, metallic mesh, metallic felt and metallic foams and combinations of one or more of these. The supporting material can vary widely in thickness. Preferably the supporting material has a thickness in the range from equal to or more than 100 micrometer, preferably equal to or more than 200 micrometer to equal to or less than 1 centimeter, suitably equal to or less than 5 millimeter, more suitably equal to or less than 1 millimeter and even more suitably equal to or less than 600 micrometer.

In one embodiment, in step c), a layer of the adhesive composition is coated onto a side of the layer of the carrier-binder paste, whereafter the layer of supporting member is attached to the coated side of the layer of carrier-binder paste. In an alternative embodiment, in step c), a layer of the adhesive composition is coated onto a side of the layer of supporting member, whereafter the layer of carrier-binder paste is attached to the coated side of the supporting member.

The layer of the adhesive composition can be coated onto a side of the layer of the carrier-binder paste or, as applicable, onto a side of the supporting member, in any manner known by the person skilled in the art to be suitable therefore. For example the coating can be applied by a hand coater, a paint roller, spraying, airbrushing, knive coating or dipping. Application by means of rolling is preferred.

The combination of (layers of) supporting material, adhesive composition and carrier-binder paste is preferably pressed at a pressure of at least 15 kilopascal, more preferably at a pressure of equal to or more than 20 kilopascal and still more preferably at a pressure of equal to or more than 25 kilopascal. It can even be preferred to apply much higher pressures, such as pressures equal to or more than 100 kilopascal or even equal to or more than 1.0 megapascal. The pressure applied can be as high as 2.5 megapascal (corresponding to about 2500 kilopascal). Preferably the combination of (layers of) supporting material, adhesive composition and carrier-binder paste is pressed at a pressure of equal to or less than 2.0 megapascal, suitably equal to or less than 1.5 megapascal. Lower pressures are also possible, for example pressures in the range from equal to or more than 20 kilopascal to equal to or less than 60 KiloPascal or equal to or less than 50 KiloPascal can be applied.

The combination of (layers of) supporting material, adhesive composition and carrier-binder paste is preferably pressed for a period in the range from equal to or more than 15 minutes, more preferably equal to or more than 30 minutes, to equal to or less than 100 minutes.

The combination in step c) is preferably heated at a temperature of at least 300° C., more preferably a temperature in the range from equal to or more than 300° C., or even equal to or more than 310° C. or equal to or more than 320° C., to equal to or less than 500° C., most preferably equal to or less than 400° C. Preferably the combination is heated for a period in the range from equal to or more than 15 minutes, more preferably equal to or more than 1 hour, to equal to or less than 4 hours.

In one preferred manner, in step c), the combination is first pressed at a pressure of at least 15 KiloPascal and thereafter the pressed combination is heated at a temperature of at least 300° C. In another preferred manner, in step c), the combination is pressed at a pressure of at least 15 KiloPascal and simultaneously heated at a temperature of at least 300° C.

Step c) may comprise multiple steps or a gradient wherein the temperature and/or pressure is varied. For example, step c) may comprise a first step wherein solvent is removed from the combination of supporting material, adhesive composition and carrier-binder paste, followed by a second step wherein the combination of supporting material, adhesive composition and carrier-binder paste is pressed at a pressure of at least 15 kilopascal and/or heated at a temperature of at least 300° C.

Generally it is necessary to melt the fluorinated binder in order to obtain the desired mechanical stability. This melting is sometimes also referred to as sintering and for PTFE, such sintering generally takes place at a temperature around 320° C.

The pressurizing and heating in step c) advantageously allows the structure of the gas diffusion layer to be sintered appropriately and/or to allow the appropriate pores to form.

Step c) can conveniently be carried out in a hot press.

The method according to the invention advantageously allows one to prepare a gas diffusion layer that has improved mechanical stability. The gas diffusion layer thus obtained is therefore also believed to be novel and inventive. This invention therefore also provides a gas diffusion layer obtained or obtainable by the method as described above.

Preferably such gas diffusion layer comprises at least:
  (i) a microporous carrier-binder layer having a pore size distribution with a mean pore diameter in the range from equal to or more than 1 micrometer to equal to or less than 100 micrometer, preferably equal to or less than 50 micrometer; and
  (ii) a macroporous supporting material layer having a pore size distribution with a mean pore diameter in the range from equal to or more than 100 micrometer to equal to or less than 5000 micrometer (corresponding to 5 millimeter), more preferably equal to or less than 2000 micrometer (corresponding to 2 millimeter), even more preferably equal to or less than 1000 micrometer (corresponding to 1 millimeter), still more preferably equal to or less than 800 micrometer and most preferably equal to or less than 500 micrometer,
  wherein an adhesive layer is present between the microporous carrier-binder layer and the macroporous supporting layer, which adhesive layer is attached to both the microporous carrier-binder layer and the macroporous supporting layer.
The adhesive layer can be microporous, having a pore size distribution with a mean pore diameter in the range from equal to or more than 1 micrometer to equal to or less than 100 micrometer, preferably equal to or less than 50 micrometer; or can be macroporous, having a pore size distribution with a mean pore diameter in the range from equal to or more than 100 micrometer to equal to or less than 5000 micrometer (corresponding to 5 millimeter), more preferably equal to or less than 2000 micrometer (corresponding to 2 millimeter), even more preferably equal to or less than 1000 micrometer (corresponding to 1 millimeter), still more preferably equal to or less than 800 micrometer and most preferably equal to or less than 500 micrometer.

Preferences for the carrier-binder layer are as mentioned above for the layer of carrier-binder paste, except that the solvent is removed from such, and preferences for the adhesive layer are as mentioned above for the layer of adhesive composition, except that the solvent is removed from such.

Preferences for the supporting material layer are as mentioned above for the layer of supporting material.

In addition the present invention provides a method for preparing a novel and inventive gas diffusion electrode comprising such a gas diffusion layer. Suitably the present invention provides a method for the preparation of a gas diffusion electrode, containing the steps of:
  a) preparing a carrier-binder paste comprising a solvent, a fluorinated binder and conductive carrier particles;
  b) preparing an adhesive composition comprising
    a solvent,
    a fluorinated binder and
    essentially no or equal to or less than 15 wt. % of conductive carrier particles, based on the total weight of fluorinated binder and any conductive carrier particles; and
  c) combining a layer of supporting material, a layer of the adhesive composition and a layer of the carrier-binder paste, wherein the layer of the adhesive composition is applied between the layer of supporting material and the layer of the carrier-binder paste, and
  pressing the combination of supporting material, adhesive composition and carrier-binder paste at a pressure of at least 15 kilopascal and/or
  heating the combination of supporting material, adhesive composition and carrier-binder paste at a temperature of at least 300° C.; and
  d) applying a catalytic layer, which catalytic layer comprises a catalyst, onto the layer of the carrier-binder paste on the side opposite of the side where the layer of the adhesive composition was applied.

Preferences for steps a), b) and c) are as described above for the method for preparation of gas diffusion layer.

Step d) can be carried out in any manner known by a person skilled in the art to be suitable therefore. The catalytic layer in step d) can be any catalytic layer known by a person skilled in the art to be suitable and can for example include catalysts as mentioned in WO2015184388A1 and WO2017112900A1. Preferably the catalytic layer includes a metallic catalyst supported on conductive carrier particles. More preferably the catalytic layer comprises a catalyst, a fluorinated binder and conductive carrier particles. Examples of metallic catalysts include Indium (In), Tin (Sn), Copper (Cu), Nickel (Ni), Cobalt (Co), Bismuth (Bi) and combinations thereof. Most preferred is a catalyst comprising indium, bismuth or a combination of indium and bismuth. Preferences for the fluorinated binder and the conductive carrier particles are as described above for steps a) and b).

The method according to the invention advantageously allows one to prepare a gas diffusion electrode that has improved mechanical stability. The gas diffusion electrode thus obtained is therefore also believed to be novel and inventive. This invention therefore also provides a gas diffusion electrode obtained or obtainable by the method as described above.

The gas diffusion layer and gas diffusion electrode according to the invention can advantageously be applied in an electrochemical cell. The present invention therefore also provides an electrochemical cell comprising a gas diffusion layer and/or a gas diffusion electrode as described above. Further preferences for such an electrochemical cell are as described in WO2015184388A1 and WO2017112900A1.

Such electrochemical cell can advantageously be used for an electrochemical process such as the electrochemical reduction of carbon dioxide. The present invention therefore also provides a process for electrochemically reducing carbon dioxide, comprising:

introducing an anolyte to a first cell compartment of an electrochemical cell, the first cell compartment comprising an anode;

introducing a catholyte and carbon dioxide to a second cell compartment of the electrochemical cell, the second cell compartment comprising a cathode; and applying an electrical potential between the anode and the cathode sufficient to reduce the carbon dioxide to a reduced reaction product, wherein the cathode comprises a gas diffusion layer and/or a gas diffusion electrode as described herein. Further preferences for such a process are as described in WO2015184388A1 and WO2017112900A1. Most preferably the process is a process wherein carbon dioxide is reduced to a reduced reaction product selected from carboxylates and/or carboxylic acids, such as for example formate, formic acid, oxalate or oxalic acid.

The process can be carried out in an aqueous or non-aqueous medium.

EXAMPLES

Example 1—Preparation of a Gas Diffusion Layer (GDL) Including a Layer of Adhesive Composition A gas diffusion layer (GDL) was prepared by the following procedure.

In a beaker, a 16.56 milliliter (mL) polytetrafluorethene (PTFE) dispersion (containing about 60 wt. % PTFE) was suspended in a 60 ml isopropanol (IPA)/water (50:50) solution. This obtained first suspension was stirred at room temperature (about 20° C.) for about 3 minutes, whereafter the solution increased in viscosity and changed into a gel. This first suspension contained about 0.14 grams of PTFE per milliliter of solvent. Subsequently the suspension was poured into a mixer comprising 15 grams of carbon acetylene black (100% carbon, made from the thermal decomposition of acetylene gas). The beaker was rinsed with 10 ml of the isopropanol (IPA)/water (50:50) solution and this additional solution was added to the mixer as well. The suspension and carbon acetylene black were allowed to mix for at least 1 minute to prepare a carbon-PTFE paste.

The carbon-PTFE paste was rolled into a layer by rolling with a marble rolling pin for about 10 minutes. An additional amount of the isopropanol (IPA)/water (50:50) solution was added in intervals as the paste was being rolled into a layer. Subsequently the paste was calendered into a layer with a thickness in the range from 1.1 to 1.5 millimeter (mm), a length of about 200 mm and a width of about 125 mm.

The layer of carbon-PTFE paste was placed on aluminum foil, which was in turn placed on a compression plate.

Subsequently a polytetrafluorethene (PTFE) dispersion (containing about 60 wt. PTFE) was diluted with isopropanol (IPA)/water (50:50) solution to prepare a second suspension containing about 0.45 grams of PTFE per milliliter of solvent. This second suspension was coated with a paint roller onto the surface of the layer of carbon-PTFE paste, which became coated with the second suspension. Two strokes up and two strokes down.

Hereafter a layer of woven graphitized carbon (i.e. the supporting material) was placed onto the coated side of the carbon-PTFE paste.

Subsequently a metal pattern plate was placed on top of the woven graphitized carbon and then another layer of aluminum foil was placed on top of such. Hereafter another compression plate was placed on top.

Then the compression plate sandwich containing all the above was pressed at about 1.2 megapascal and heated at a temperature of about 318° C. for about 32.5 minutes.

Hereafter the obtained gas diffusion layer, comprising the carbon-PTFE layer attached to the woven graphitized carbon, was released from the compression plates and the aluminum foil was removed. It was attempted to manually detach the carbon-PTFE layer from the woven graphitized carbon. It was only possible to peel off small bits and pieces with considerable manual force.

Comparative Example A—Preparation of a Gas Diffusion Layer (GDL) not Including a Layer of Adhesive Composition A gas diffusion layer (GDL) was prepared by the following procedure.

Similarly to example 1, in a beaker, a 16.56 milliliter (mL) polytetrafluorethene (PTFE) dispersion (containing about 60 wt. % PTFE) was suspended in a 60 ml isopropanol (IPA)/water (50:50) solution. This obtained first suspension was stirred at room temperature (about 20° C.) for about 3 minutes, whereafter the solution increased in viscosity and changed into a gel. This first suspension contained about 0.14 grams of PTFE per milliliter of solvent. Subsequently the suspension was poured into a mixer comprising 15 grams of carbon acetylene black (100% carbon, made from the thermal decomposition of acetylene gas). The beaker was rinsed with 10 ml of the isopropanol (IPA)/water (50:50) solution and this additional solution was added to the mixer as well. The suspension and carbon acetylene black were allowed to mix for at least 1 minute to prepare a carbon-PTFE paste.

The carbon-PTFE paste was rolled into a layer by rolling with a marble rolling pin for about 10 minutes. An additional amount of the isopropanol (IPA)/water (50:50) solution was added in intervals as the paste was being rolled into a layer. Subsequently the paste was calendered into a layer with a thickness in the range from 1.1 to 1.5 millimeter (mm), a length of about 200 mm and a width of about 125 mm.

The layer of carbon-PTFE paste was placed on aluminum foil, which was in turn placed on a compression plate.

In contrast to example 1, no second suspension was prepared and the carbon-PTFE paste was not coated.

A layer of woven graphitized carbon (i.e. the supporting material) was placed onto the non-coated carbon-PTFE paste.

Subsequently a metal pattern plate was placed on top of the woven graphitized carbon and then another layer of aluminum foil was placed on top of such. Hereafter another compression plate was placed on top.

Then the compression plate sandwich containing all the above was pressed at about 1.2 megapascal and heated at a temperature of about 318° C. for about 32.5 minutes.

Hereafter the obtained gas diffusion layer, comprising the carbon-PTFE layer attached to the woven graphitized carbon, was released from the compression plates and the aluminum foil was removed.

It was attempted to manually detach the carbon-PTFE layer from the woven graphitized carbon. The carbon-PTFE layer and the woven graphitized carbon layer could easily be detached with minimal opposing force being applied. The layer of woven graphitized carbon simply peeled off.

As illustrated by example 1 and comparative example A, the use of a preparation method as currently claimed results in an improved mechanical stability of the gas diffusion layer.

The invention claimed is:

1. A method for preparation of a gas diffusion layer, containing the steps of:
   a) preparing a carrier-binder paste comprising a solvent, a fluorinated binder and conductive carrier particles;
   b) preparing an adhesive composition comprising:
      a solvent
      a fluorinated binder and
      essentially no or equal to or less than 15 wt. % of conductive carrier particles, based on the total weight of the fluorinated binder in the adhesive composition and the conductive carrier particles in the adhesive composition; and
   c) combining a layer of supporting material, a layer of the adhesive composition and a layer of the carrier-binder paste, wherein the layer of the adhesive composition is applied between the layer of the supporting material and the layer of the carrier-binder paste, wherein the layer of the carrier-binder paste has a thickness in a range from equal to or more than 1.1 mm to equal to or less than 1.5 mm; and
   pressing the combination of supporting material, adhesive composition and carrier-binder paste at a pressure of at least 15 kilopascal and/or
   heating the combination of supporting material, adhesive composition and carrier-binder paste at a temperature of at least 300° C.;
   wherein the carrier-binder paste comprises equal to or less than 0.3 grams fluorinated binder per milliliter of solvent, and wherein the adhesive composition comprises equal to or more than 0.3 grams fluorinated binder per milliliter of solvent.

2. The method according to claim 1, wherein the conductive carrier particles are carbon particles.

3. The method according to claim 1, wherein the fluorinated binders comprise one or more fluorinated polymers chosen from the group consisting of polytetrafluoroethylene polymers, perfluoroalkoxy polymers, fluorinated ethylene propylene polymers and polyvinylidene difluoride polymers.

4. The method according to claim 1, wherein the carrier-binder paste contains, based on the total weight of fluorinated binder in the carrier-binder paste and conductive carrier particles in the carrier-binder paste together, in the range from equal to or more than 20 wt. % to equal to or less than 60 wt. % of fluorinated binder and in the range from equal to or more than 40 wt. % to equal to or less than 80 wt. % of conductive carrier particles.

5. The method according to claim 1, wherein the solvent in the carrier-binder paste and/or the adhesive composition contains or consists of water and/or an alkanol.

6. The method according to claim 5, wherein the solvent in the carrier-binder paste and/or the adhesive composition contains an alkanol, and wherein a suspension of the fluorinated binder in such solvent is prepared by:
   combining the fluorinated binder and the solvent; and
   mixing the fluorinated binder and the solvent during a period in the range from equal to or more than 10 seconds to equal to or less than 15 minutes.

7. The method according to claim 1, wherein the adhesive composition comprises a higher concentration of fluorinated binder, based on grams of fluorinated binder per milliliter of solvent, than the carrier-binder paste.

8. The method according to claim 1, wherein, in step a), the carrier-binder paste is prepared by making a suspension of the fluorinated binder in the solvent and subsequently mixing the conductive carrier particles with the suspension.

9. The method according to claim 1, wherein, in step c), a layer of the adhesive composition is coated onto a side of the layer of the carrier-binder paste, whereafter the supporting material is attached to the coated side of the layer of carrier-binder paste.

10. A gas diffusion layer obtained or obtainable by the method according to claim 1.

11. A method for preparation of a gas diffusion electrode, containing the steps of:
   a) preparing a carrier-binder paste comprising a solvent, a fluorinated binder and conductive carrier particles;
   b) preparing an adhesive composition comprising
      a solvent,
      a fluorinated binder and
      essentially no or equal to or less than 15 wt. % of conductive carrier particles, based on the total weight of the fluorinated binder in the adhesive composition and the conductive carrier particles in the adhesive composition;
   c) combining a layer of supporting material, a layer of the adhesive composition and a layer of the carrier-binder paste, wherein the layer of the adhesive composition is applied between the layer of supporting material and the layer of the carrier-binder paste, wherein the layer of the carrier-binder paste has a thickness in a range from equal to or more than 1.1 mm to equal to or less than 1.5 mm; and
   pressing the combination of supporting material, adhesive composition and carrier-binder paste at a pressure of at least 15 kilopascal and/or heating the combination of supporting material, adhesive composition and carrier-binder paste at a temperature of at least 300° C.; and
   d) applying a catalytic layer, which catalytic layer comprises a catalyst, onto the layer of the carrier-binder paste on a side opposite of a side where the layer of the adhesive composition was applied
   wherein the carrier-binder paste comprises equal to or less than 0.3 grams fluorinated binder per milliliter of solvent, and wherein the adhesive composition comprises equal to or more than 0.3 grams fluorinated binder per milliliter of solvent.

12. The method according to claim 11, wherein the catalytic layer comprises the catalyst, a fluorinated binder and conductive carrier particles.

13. The method according to claim 11, wherein the catalyst comprises indium, bismuth or a combination of indium and bismuth.

14. A gas diffusion electrode comprising a gas diffusion layer obtained or obtainable by a method according to claim 11.

15. A process for electrochemically reducing carbon dioxide, comprising:
   introducing an anolyte to a first cell compartment of an electrochemical cell, the first cell compartment comprising an anode;

introducing a catholyte and carbon dioxide to a second cell compartment of the electrochemical cell, the second cell compartment comprising a cathode; and applying an electrical potential between the anode and the cathode sufficient to reduce the carbon dioxide to a reduced reaction product, wherein the cathode comprises a gas diffusion layer, the gas diffusion layer obtained by a method containing the steps of:

a) preparing a carrier-binder paste comprising a solvent, a fluorinated binder and conductive carrier particles;

b) preparing an adhesive composition comprising:

a solvent, a fluorinated binder and essentially no or equal to or less than 15 wt. % of conductive carrier particles, based on the total weight of the fluorinated binder in the adhesive composition and the conductive carrier particles in the adhesive composition; and c) combining a layer of supporting material, a layer of the adhesive composition and a layer of the carrier-binder paste, wherein the layer of the adhesive composition is applied between the layer of supporting material and the layer of the carrier-binder paste, wherein the layer of the carrier-binder paste has a thickness in a range from equal to or more than 1.1 mm to equal to or less than 1.5 mm; and pressing the combination of supporting material, adhesive composition and carrier-binder paste at a pressure of at least 15 kilopascal and/or heating the combination of supporting material, adhesive composition and carrier-binder paste at a temperature of at least 300° C.;

wherein the carrier-binder paste comprises equal to or less than 0.3 grams fluorinated binder per milliliter of solvent, and wherein the adhesive composition comprises equal to or more than 0.3 grams fluorinated binder per milliliter of solvent.

* * * * *